United States Patent Office 3,812,027
Patented May 21, 1974

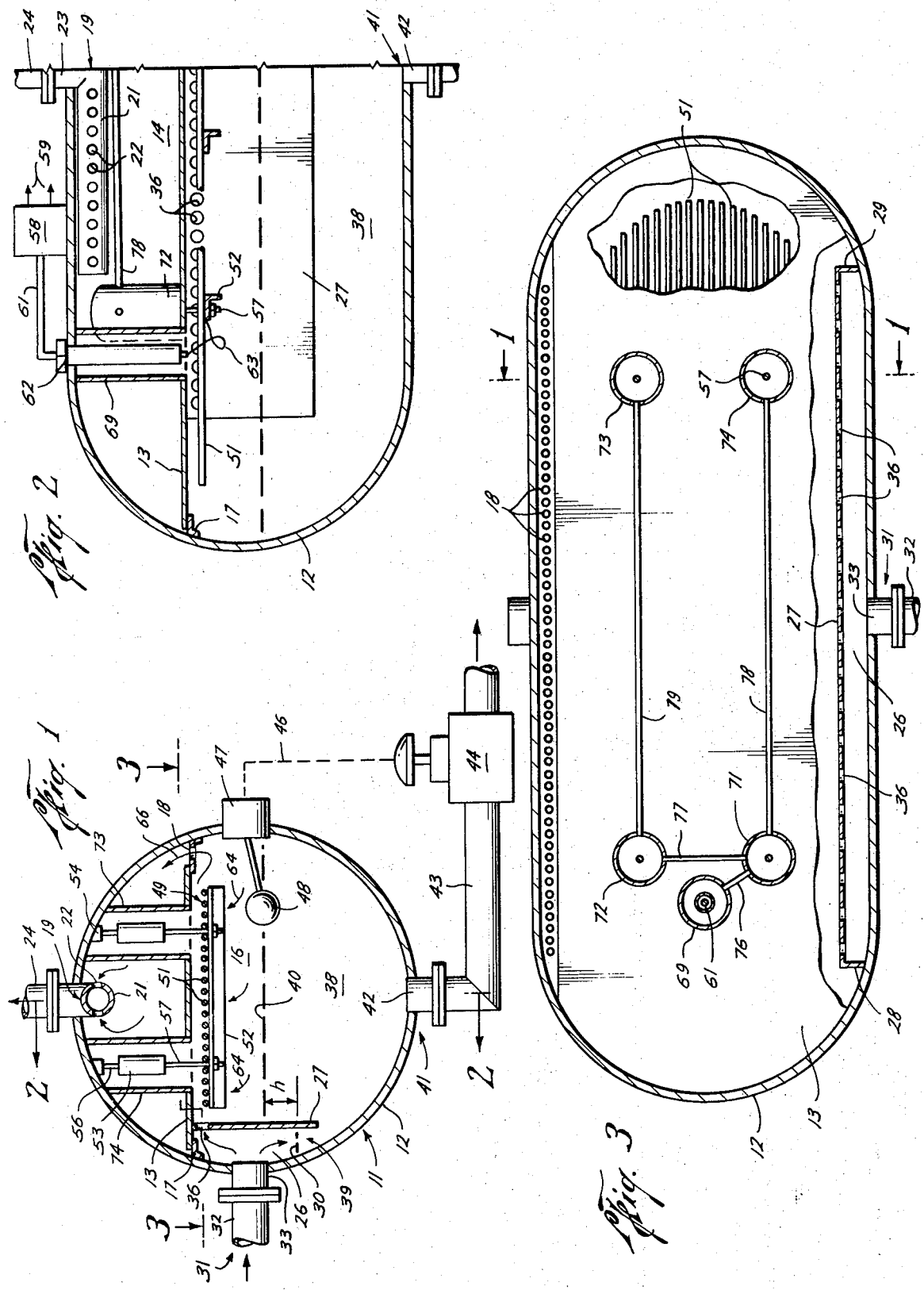

3,812,027
SEPARATOR FOR OIL-CONTINUOUS DISPERSIONS
Howell R. Jarvis and Ernest A. Cole, Jr., Houston, Tex., assignors to Petrolite Corporation, St. Louis, Mo.
Filed Oct. 17, 1972, Ser. No. 299,494
Int. Cl. B03c *5/02*
U.S. Cl. 204—302
13 Claims

ABSTRACT OF THE DISCLOSURE

A separator for oil-continuous dispersions containing a dispersed water phase. A horizontal vessel contains a horizontal non-pressure baffle forming an outlet zone superimposed above an electric field treatment zone. Openings along one side of the baffle provide fluid communication between these zones. An open-bottom inlet zone, extending longitudinally along the other side of the vessel, is formed by a vertical non-pressure baffle extending downwardly from the horizontal baffle to adjacent the bottom of the vessel. A water separation zone extends upwardly to a horizon intermediate the open bottom of the inlet zone and the horizontal baffle to define the electrical field treatment zone. Passageways in the vertical baffle deliver dispersion from the inlet zone into the electric field treatment zone with volumes of bulk water phase being discharged downwardly through the open bottom of the inlet zone into the water separation zone. Electric field resolution produces a dry oil phase passing into the outlet zone for removal from the vessel. Accumulating water phase is removed through an outlet from the water separation zone.

BACKGROUND OF THE INVENTION

(1) Field of the invention

This invention relates to the separation of oil-continuous dispersions containing a dispersed water phase, and in particular, to a separator employing high voltage unidirectional electrical fields for resolving the dispersion.

(2) Description of the prior art

The separation of oil-continuous dispersions containing dispersed water phases has been accomplished by the use of phase separation mechanisms employing electrical fields for many years. In the oil industry, separation of these dispersions has been promoted by the application of electrical fields for over sixty years. The term "oil" is meant to include any hydrocarbon, which hydrocarbon usually will be a petroleum distillate. The dispersed aqueous phase is principally water, but may include suspended solids. This phase has a composition that usually has a higher electrical conductivity than the oil of the continuous phase. The aqeous dispersed phase may be acidic or alkaline. For example, the aqueous phase may be the result of prior refinery processing (steam stripping, etc.) of the oil phase. The deliberate addition of small amounts of treating chemicals, such as acids or caustic materials, can produce a dispersed aqueous phase in the continuous oil phase. Also, the oil phase has a lower dielectric constant than the aqueous phase. Subjecting the resultant dispersion to an electric field promotes the separation from the oil phase of the aqueous phase by coalescence of the dispersed aqueous droplets. Preferably, the electric field is created by applying a high voltage unidirectional potential to spaced electrodes. The electric field can be provided by energization of suitable electrodes to DC potentials between 5 and 75 kilovolts. The spacing between the energized electrodes, and surrounding metal objects, usually produces between 2 and 30 kilovolts per inch of electrical gradient in the electric field. Electrical treaters such as illustrated in U.S. Pats. 3,205,161 and 3,342,720 describe separators for the described dispersions that are highly efficient in their operation. The separator described in these patents employs vertical flow through elongated electrical cells containing vertical rods energized to relatively high DC potentials. The dispersion is introduced through an inlet below these cells, and then passes upwardly at a uniform rate within the electrical field for highly efficient separation of the dispersed aqueous phase from the oil-continuous phase. Other types of vertical flow separators are also employed in separation of these dispersions. Unintentional introduction of a "slug" or large volume of bulk water phase with the incoming dispersion flow can upset temporarily the operation of even the best designed vertical flow separators. For example, the efficient reduction of the dialkylsulfate content of the alkylate is described in U.S. Pat. 3,325,391. It is possible that the alkylation unit supplying the alkylate (containing dispersed acids) can undergo an upset which causes a substantial bulk volume (slug) of alkylation acid to pass into the alkylate product stream. The electrical treater, employed for resolving dispersions, may suddenly receive a large quantity of the aqueous phase in bulk. The electrical treater can become upset momentarily by a large bulk volume of the aqueous phase until level controllers can remove sufficient aqueous phase and restore proper operation. Upstream gravity separators and accumulators can malfunction so that in other process operations a large quantity of the aqueous phase could be unintentionally introduced into a continuous hydrocarbon dispersion stream. For example, the level control on a hydrocarbon-water separator drum can malfunction to force large quantities of the separated water into the hydrocarbon product outlet which passes into an electrical treater.

Pretreatment bulk phase separators could be installed upstream of the electrical treater to reduce the problems of the inadvertent addition of bulk aqueous phase into the dispersion. However, the occasional occurrence of this problem usually does not justify any additional equipment cost. Therefore, the present invention is directed toward an electric field separator for resolving an aqueous dispersed phase from a continuous hydrocarbon phase employing a high potential electric field wherein the oil phase resides for relatively long periods of time as in vertical flow electric treaters. However, the novel separator of this invention is adapted to receive large "slugs" or bulk volumes of aqueous phase in the dispersion flow without suffering even momentary operational upsets.

SUMMARY OF THE INVENTION

In accordance with this invention, there is provided a separator for oil-continuous dispersions containing a dispersed water phase. The separator comprises a closed horizontally-elongated vessel containing a horizontal non-pressure baffle extending throughout the upper portion of the vessel. This baffle forms an outlet zone super-imposed above an electric field treatment zone. A plurality of openings are carried in the baffle along one side of the vessel for providing fluid communication between the outlet and electric treatment zones. An open-bottom inlet zone is formed by a vertical non-pressure baffle etxending downwardly from the horizontal baffle to adjacent the bottom of the vessel. The inlet zone extends longitudinally substantially the length of the vessel. The vertical baffle has end portions integrally secured to the vessel. The inlet zone is located on the opposite sides of the vessel from the openings in the horizontal baffle providing communication between the outlet and electric field treatment zones. A water separation zone is maintained substantially throughout the vessel and extends upwardy to a horizon intermediate the open bottom of the inlet zone and the horizontal baffle to thereby define the electrical field treatment zone. A high voltage electric field is established substantially throughout the horizontal length of the electric field treatment zone. Flow passage means interconnect the inlet zone with the electric field treatment zone for delivering fluid into the latter zone adjacent the horizontal baffle. The inlet means deliver fluid to the inlet zone without direct horizontal flow into the flow passage means whereby volumes of bulk water phase in the dispersion are discharged downwardly from the inlet zone into the water separation zone. Inlet means deliver dispersion into the inlet zone. First and second outlet means provide for removing treated oil from the outlet zone and for removing water from the water separation zone.

BRIEF DESCRIPTION OF THE DRAWINGS

FIG. 1 is a vertical cross-section of one embodiment of the separator of the present invention;

FIG. 2 is a vertical longitudinal section, of one-half of the separator in FIG. 1, and this section is taken along lines 2—2 thereof; and FIG. 3 is a horizontal longitudinal section taken along lines 3—3 of the separator of FIG. 1.

DESCRIPTION OF SPECIFIC EMBODIMENTS

In the drawings, there is shown a preferred embodiment of the separator of the present invention. The separator 11 is comprised of a horizontally elongated vessel 12 which is adapted to contain such fluid pressure as may be encountered in the separation of the oil-continuous dispersion. The terminology "oil-continuous dispersion" as used herein is intended to include dispersions encountered in naturally occurring fluids, such as well production fluids in oil fiields, and also in synthetic dispersions such as created by the dispersion of an aqueous phase within a petroleum distillate, and this terminology includes other like systems.

The vessel 12 usually is insulated for proper operation, but insulation is omitted to simplify illustration of the present embodiment. The vessel 12 carries a horizontal non-pressure baffle 13 which extends throughout the upper portion of the vessel 12. The baffle forms an outlet zone 14 superimposed above an electrical field treatment zone 16. The baffle 13 is secured to the side walls of the vessel 12 by any suitable means such as by being bolted to a fillet 17 welded to the vessel 12. The horizontal baffle 13 connection to the vessel 12 need not provide an absolute fluid seal against leakage of any fluids between the mentioned zones. However, the horizontal baffle 13 should be secured sufficiently intimately to the vessel 12 that substantially all fluid flow is through a plurality of openings 18 which are carried along one side of the baffle 13. The openings may take any form and equal sized, uniformly-spaced round holes, slots, or other types of like functioning openings can be used which provide for substantially uniform fluid flow from the electrical field treatment section zone 16 upwardly through such openings in the outlet zone 14. The openings 18 should provide a sufficiently large flow passageway that fluid flows exert only a few ounces of pressure across the baffle 13. As a result, the baffle may be formed of very thin metal, e.g., ⅛-inch sheet steel.

The outlet zone 14 connects with a treated oil outlet conduit 19. The conduit 19 may be of any suitable form. The conduit 19 preferably includes a horizontal pipe 21 which extends longitudinally adjacent the top portion of the vessel 12. A plurality of openings 22 in the pipe 21 provide for the uniform removal of the treated oil throughout the outlet zone. The treated oil is removed through the pipe 21 and a nozzle 23 on the vessel 12. Suitable piping 24 for carrying the treated oil to its ultimate utilization connects to the nozzle 23. The piping 24 may carry a back pressure valve for insuring that the contents of the vessel 12 remain within a liquid state during normal operation of the separator 11.

An open-bottomed inlet zone 26 is provided beneath the horizontal baffle 13. The inlet zone is formed by a vertical baffle 27 which extends longitudinally substantially the length of the vessel 12. The vertical baffle 27 is secured in a substantially fluid tight interconnection to the horizontal baffle 13. The vertical baffle 27 extends downwardly to adjacent the bottom of the vessel 12. The vertical baffle 27 is secured at its ends to the vessel 12 by a fluid tight interconnection, such as by welding. As can be seen best in FIGS. 2 and 3, the vertical baffle 27 can terminate a short distance from the ends of the vessel 12. At these end locations, the vertical baffle 27 has end closures 28 and 29 secured in relative fluid tightness to the side walls of the vessel 12. The inlet zone is located on the side of the vessel 12 opposite to the position of the openings 18 in the horizontal baffle 13. An inlet 31 is provided the vessel 12 for introducing dispersion into the inlet zone 26. The inlet 31 comprises an inlet piping 32 flange connected to an inlet nozzle 33 secured to the side wall of the vessel 12. If desired, the inlet nozzle 33 may connect to a longitudinally extending flow dampener to deflect sideways flow surges in the dispersion being introduced into the inlet zone 26.

The vertical baffle 27 carries openings 36 for delivering fluid from the inlet zone 26 into the electric field treatment zone 16. In particular, the horizon at which the openings 36 are present in the vertical baffle 27, and the position of the inlet 31, are arranged so that the inlet 31 cannot deliver fluid through the inlet zone 26 with direct horizontal flow into the opening 36 in the vertical baffle 27. If desired, a flow diverting baffle can be positioned adjacent inlet 31 for this purpose. As a result, all dispersion flows enter the inlet zone 26 and either impinge upon the imperforate portion of the vertical baffle 27, or upon an intermediate baffle, throughout the longitudinal extent of the inlet zone 26. Any volumes of bulk water phases carried as "slugs" in the dispersion into the inlet zone 26 immediately fall downwardly to the open bottom of the inlet zone 26. The baffle 27 is spaced laterally from the vessel 12 a distance sufficient to insure that the interface between the dispersion and water phase at the bottom of inlet zone 26 remains horizontal throughout the range of incoming dispersion flows for which the separator 11 is designed to operate.

The openings 36 in the vertical baffle 27 may take any configuration which is capable of delivering the dispersion from the inlet zone 26 into the electric field treatment zone 16 at a substantially uniform rate throughout the longitudinal extent of the vessel 12. More particularly, the openings 36 can be of uniform open area, spaced at regular intervals, and reside in one or more horizons within the vertical baffle 27. Preferably, the openings 36 are formed by a plurality of like-sized, round holes which are equally spaced in a single horizon throughout the length of the vertical baffle 27. The driving force for moving dispersion through the openings 36 is provided in a unique manner. A water separation zone 38 is maintained in the lower portion of the vessel 12 substantially throughout its length. The water separation zone 38 extends upwardly to a horizon intermediate the open bottom 39 of the inlet zone 26 and the horizontal baffle 13. Thus, the electric field treatment zone 16 resides between the horizontal baffle 13 and the uppermost extremity of the water separation zone 38.

The water separation zone 38 is maintained within the vessel 12 in any suitable fashion within the designated structural perimeters. For this purpose, water coalesced or resolved from the dispersion gravitationally accumulates within the water separation zone. The water is removed at a sufficient rate to maintain the upper surface of the water separator zone at a desired horizon. For this purpose, a water outlet 41 is provided by a nozzle 42 secured to the lower portion of the vessel 12. A flanged connection between the nozzle 42 and outlet piping 43 allows removal of the water from the water separation zone 38 at a regulated rate by operation of a motor control valve 44. The motor control valve is operated by remote connection (indicated by a chain line 46) to a level controller 47 that is actuated by float 48. The upper extremity of the water separation zone 38 is maintained at a relatively fixed horizon within the vessel 12. As a result, the lower extremity of the vertical baffle 27 surrounding the open bottom 39 is always water-sealed, i.e., immersed within the water separation zone 38.

The driving force for moving fluid from the inlet zone 26 through the openings 36 into the electric field treatment zone 16 is provided by a slight pressure differential of a few ounces of pressure across these openings. For this reason, the vertical baffle 27 can be thin sheet steel, e.g., ⅛ in thickness. More particularly, the inflow of the dispersion into the inlet zone 26 causes the oil-water interface 30 within the lower portion thereof to be depressed a distance "$h$" below the horizon 40 at which the upper surface of the water separation zone 38 is being maintained. The height "$h$" is the water head which represents the pressure differential between the oil-water interface 30 inside the inlet zone 26 and at the controlled horizon 40 between the electric treatment zone 16 and water separation zone 38. This pressure differential is limited to only a few ounces of water pressure head (usually 2–3 ounces), but the resulting force is sufficient to drive the dispersion through each of the openings 36 with uniform flows substantially identical in rate throughout the length of the vertical baffle 27. Although this pressure differential is very small, it is a substantial pressure differential compared to the unobstructed flow of water through the open bottom 39 of the inlet zone 26. The function of the water sealed, open bottom 39 on the inlet zone 26 is to provide for uniform driving force for moving the dispersion through the holes 36 into the electric field treatment zone 16. Where the openings 36 are all identical in size, uniform in spacing, and placed along a single horizon throughout the extent of the vertical baffle 27, the flow through each of the openings of the dispersion is identical, and the particular rate of flow through each opening is determined by the rate of flow of dispersion from the inlet 31 into the inlet zone 26. The pressure differential represented by the height "$h$" is representative of the driving force and varies responsively only to the amount of dispersion entering the inlet zone 26. The amount of bulk volumes of water which fall into the open bottom 39 of inlet zone 26 produce relatively little effect on dispersion flow through openings 39.

A high voltage electric field is established substantially throughout the horizontal length of the electric field treatment zone 16. For this purpose, any convenient electrode structure may be employed. Preferably, the electrode structure is constructed of a metallic foraminous material which is mounted in electrical isolation from the metal components on the vessel 12. For example, the electrode 49 can be formed of a plurality of metal rods 51 which are secured to transverse bars 52 forming a planar and foraminous electrode structure. Preferably, the electrode 49 is mounted horizontally within the electric field treatment zone 16 throughout the extent of the vessel 12. The electrode 49 is suspended in electrical isolation from the vessel 12 by insulators 53 mounted in suspension from the upper surface of the vessel 12 using hangers 54 and suspenion rods 56. Support rods 57 extend downwardly from the insulators 53 and are secured to the transverse bars 52 on the electrode 49.

The electode 49 can be placed in any relative position desired within the electric field treatment zone 16. However, the electrode is preferably mounted substantially horizontally and adjacent the mid-line of the vessel 12. In particular, the electrode 24 is positioned in a horizon relative to the vertical baffle 27 such that the openings 36 discharge dispersion approximately mid-height the distance between the electrode 49 and the horizontal baffle 13.

Also, the electrode 49 is so arranged for best results in its being disposed at a horizon located substantially equidistant from the upper surface or horizon 40 of the water separation zone 38 and the horizontal baffle 13.

The electrode 49 can be energized from any suitable electrical source to provide a high voltage electrical field in the electrical field treatment zone 16. More particularly, the high voltage electric field is preferably produced by a high-potential, unidirectional source of current. For this purpose, as can be seen in FIG. 2, a DC power source 58 connects to primary power conductors 59. The power source 58 is arranged to provide a high voltage unidirectional potential between 2 and 75 kilovolts relative to the vessel 12. An insulated conductor 61 extends from the power source 58 to an inlet entrance bushing 62 carried in the upper surface of the vessel 12. The bushing 62 extends downwardly into the upper portion of the vessel 12 and connects by a flexible lead 63 to the electrode 49. Thus, the high voltage potential is applied to the electrode 49 from the power source 58.

Energization of the electrode 49 produces an electric field of sufficient intensity to insure coalescense of dispersed water phase in the dispersion flowing through the openings 36. The coalesced water droplets gravitate downwardly and merge into the water separation zone 38. As a result, the electric field treatment zone 16 is filled throughout its horizontal extent with a relatively dry oil phase. The flow of the dispersion through the openings 36 causes a recirculation of this dry oil into the incoming stream of dispersions as indicated by the arrows 64. At the remote side of the vessel 12 from the inlet zone 27, the purified oil phase passes through the openings 18 in the horizontal baffle 13 into the outlet zone 14 as indicated by arrow 66.

The outlet zone 14 provides for a substantially extended settling period before the dry oil is removed through the outlet conduit 19. Any water phase which might yet coalesce from the dry oil falls downwardly and rests upon the upper surface of the horizontal baffle 13. Should any appreciable amount of water phase accumulate, it can readily flow downwardly through the openings 18 and merge into the water separation zone 38. For this purpose, the openings 18 should have approximately the area open to fluid flow as compared to the openings 36 in the vertical baffle 27. Stated in another manner, the openings 36 should produce a pressure differential in fluid flow therethrough which is not less than that presented to the flow of the dispersion through the openings 18.

If desired, the insulators 53 and entrance bushing 62 may be protected against any possible accumulation of surface moisture by condensation in the outlet zone 14. For this purpose, cylindrical conduits 69 through 74 extend from the horizontal baffle 13 to the upper surface of the vessel 12. These conduits are secured in substantially fluid tight interconnection to the horizontal baffle and to the upper surfaces of the vessel 12. In this manner, the insulator 53 and entrance bushing 62 are isolated in the outlet zone 14. If desired, the space within these conduits may be filled with a non-conductive gaseous medium, such as nitrogen. This medium can be introduced into the conduit 69 containing the entrance bushing 62 and then carried by interconnecting pipes 76 through 79 to the remainder of the conduits. Sufficient amounts of the gaseous medium are introduced into these conduits so that the insulators 53 and bushing 62 are substantially surrounded in their entire lengths by the gaseous medium. Thus, the amount of moisture which can accumulate along the insulating surfaces of these members is substantially reduced.

It will be apparent from the foregoing description of the structure of the present separator 11, that the unit will operate with the electric field treatment of dispersion along an extended path in the electric field and an extended residence time in the quiescent settling atmosphere of the outlet zone 14. Variations in flow of the dispersion into the inlet zone 26 are accommodated by changes in the height "h" between the horizon 40 of the water separator zone 38 and the oil-water interface 30 within the open bottom 39 of the inlet zone. Should a large bulk volume of the water phase suddenly be introduced into the inlet zone 26, the bulk water phase quickly disengages from the dispersion and falls downwardly into the open bottom 39 and merges into the water separation zone 38. The amount of bulk volume of the water phase is a relatively small portion of the total volume of water contained in the water separation zone. Therefore, the change of the height "h" responds only slightly to accommodate such large amounts of water, and little variation in height "h" occurs to influence the rate of flow of the dispersions through the opening 36 in the vertical baffle 27. Thus, no bulk water phase can appear in the electric field treatment zone 16 to shortcircuit the electrode 49 to adjacent metal or other conductive parts associated with the vessel 12.

It will be apparent that the described separator 11 provides several unique functions while performing the desired coalescence of oil-continuous dispersions containing a dispersed water phase, especially in a high potential unidirectional electric field. The separator can handle large amounts of bulk water phase which might enter the inlet zone 26 without interrupting the electric field treatment of the dispersion flowing through the openings 36 in the vertical baffle 27.

The electrode 49 could be constructed in other forms and might even be replaced by solid metal plate. If desired, the electrode 49 can be placed in a non-horizontal plane transverse to the longitudinal axis of the vessel 12. This inclined mounting of the electrode 49 produces a varying gradient electric field to the incoming dispersions introduced through the openings 36. Thus, the dispersion entering the vessel 12 can be subjected to a constant gradient, or a variable gradient, electric field for treatment by whichever mode produces optimum results.

Various modifications and alterations in the described separator will be apparent to those skilled in the art from the foregoing description. For this reason, changes which do not depart from the spirit of the invention are intended to be included within the scope of the appended claims. The appended claims define the present invention; and the foregoing description is to be employed for setting forth the present embodiment as illustrative in nature.

What is claimed is:

1. A separator for oil-continuous dispersions containing a dispersed water phase, said separator comprising:
   (a) a closed horizontally-elongated vessel;
   (b) a horizontal non-pressure baffle extending throughout the upper portion of said vessel, said baffle forming an outlet zone superimposed above an electrical field treatment zone adjacent said vessel's mid-line; and said baffle carrying a plurality of openings along one side for providing fluid communication between said outlet and electrical field treatment zones;
   (c) first outlet means for removing treated oil from said outlet zone;
   (d) an open-bottomed inlet zone formed by a vertical non-pressure baffle extending downwardly from said horizontal baffle to adjacent the bottom of said vessel and longitudinally substantially the length of said vessel in fluid-tight engagement to said horizontal baffle, and said vertical baffle having end portions integrally secured to said vessel, and said inlet zone being located on the side of said vessel opposite the position of said openings in said horizontal baffle;
   (e) means for maintaining a water separation zone substantially throughout said vessel and said water separation zone extending upwardly to a horizon intermediate the open bottom of said inlet zone and said horizontal baffle to define said electrical field treatment zone;
   (f) second outlet means for removing water from said water separation zone;
   (g) means for establishing a high voltage electric field substantially throughout the horizontal length of said electrical field treatment zone;
   (h) inlet means for delivering dispersion into said inlet zone; and
   (i) flow passage means interconnecting said inlet zone with said electrical field treatment zone for delivering fluid from said inlet zone into said electrical field treatment zone adjacent said horizontal baffle, said dispersion being delivered responsively to a substantial pressure differential compared to unobstructed flow thereof and the magnitude of the pressure differential varying directly with the amount of the dispersion entering said inlet zone and substantially uninfluenced by any bulk volumes of the aqueous phase carried with the dispersion, and said inlet means delivering fluid into said inlet zone without direct horizontal flow into said flow passage means whereby any volumes of bulk water phase carried in the dispersion are discharged downwardly from said inlet zone through the open bottom thereof in a substantially unobstructed flow into said water separation zone.

2. The separator of claim 1 wherein said means for establishing an electric field includes a metallic forminous electrode carried in electrical isolation from metal components on said vessel and said electrode extending substantially throughout said electrical field treatment zone.

3. The separator of claim 2 wherein said foraminous electrode is planar in configuration.

4. The separator of claim 3 wherein said foraminous electrode is disposed substantially horizontally in said electrical field treatment zone adjacent the mid-line of said vessel.

5. The separator of claim 1 wherein said foraminous electrode is energized to a DC potential between 2 and 75 kilovolts relative to said vessel.

6. The separator of claim 3 wherein said foraminous electrode is disposed substantially horizontally in said electrical field treatment zone and at a uniform vertical-spacing from said horizontal baffle and water separation zone.

7. The separator of claim 2 wherein said foraminous electrode comprises spaced apart rows of horizontally disposed rod electrodes which extend longitudinally in said vessel, and said rod electrodes are adapted to receive energization from an external source of high potential for creating the high voltage field in said electrical field treatment zone.

8. The separator of claim 3 wherein said electrode is suspended from the top of said vessel by insulator means contained in vertically oriented cylindrical conduits which extend from said horizontal baffle to the upper surface of said vessel and secured thereto in fluid isolation from said outlet zone.

9. The separator of claim 8 wherein said cylindrical conduits are interconnected to a source of a non-conductive gaseous medium for surrounding said insulator means carried in said conduits with the gaseous medium.

10. The separator of claim 1 wherein said flow passage means comprise a plurality of individual passageways aligned in the horizontal in said vertical baffle for delivery of fluid from said inlet zone substantially throughout the longitudinal extent of said electrical field treatment zone.

11. The separator of claim 10 wherein said flow passage means comprise a plurality of like size round holes disposed at a substantially uniform spacing in a single horizon throughout the horizontal extent of said vertical baffle.

12. The separator of claim 10 wherein said openings in said vertical baffle have a total area open to fluid flow at least equal to the total area of said round holes in said horizontal baffle.

13. The separator of claim 10 wherein said passageways deliver fluid into said electrical field treatment zone at a horizon intermediate said horizontal baffle and a horizontally disposed foraminous metallic planar electrode which is energized from an external source for creating a high voltage electric field.

References Cited

UNITED STATES PATENTS

| | | | |
|---|---|---|---|
| 3,649,516 | 3/1972 | Cole, Jr. et al. | 204—302 |
| 3,674,677 | 7/1972 | Roberts | 204—302 |
| 3,073,776 | 1/1963 | Turner | 204—302 |

THOMAS M. TUFARIELLO, Primary Examiner

UNITED STATES PATENT OFFICE
CERTIFICATE OF CORRECTION

Patent No. 3,812,027            Dated May 21, 1974

Inventor(s) H. R. Jarvis et al

It is certified that error appears in the above-identified patent and that said Letters Patent are hereby corrected as shown below:

Column 1, line 54, for "aqeous", read ---aqueous---;

Column 2, line 19, for "builk", read --- bulk---;
           line 57, for "super-imposed", read ---superimposed---;
           line 62, for "etxending", read ---extending---;
           line 71, for "upwardy", read ---upwardly---;

Column 3, line 34, for "fiields", read ---fields---;

Column 5, line 15, for "in", read ---in.---; and
           line 67, for "electode", read ---electrode---.

Signed and sealed this 1st day of October 1974.

(SEAL)
Attest:

McCOY M. GIBSON JR.
Attesting Officer

C. MARSHALL DANN
Commissioner of Patents